(No Model.) 3 Sheets—Sheet 1.

H. W. DOVER.
APPARATUS FOR MANUFACTURING CYCLE GEAR CASES.

No. 581,576. Patented Apr. 27, 1897.

WITNESSES.

INVENTOR:
H. W. Dover
BY
ATTORNEYS (No Model.) 3 Sheets—Sheet 2.
H. W. DOVER.
APPARATUS FOR MANUFACTURING CYCLE GEAR CASES.
No. 581,576. Patented Apr. 27, 1897.
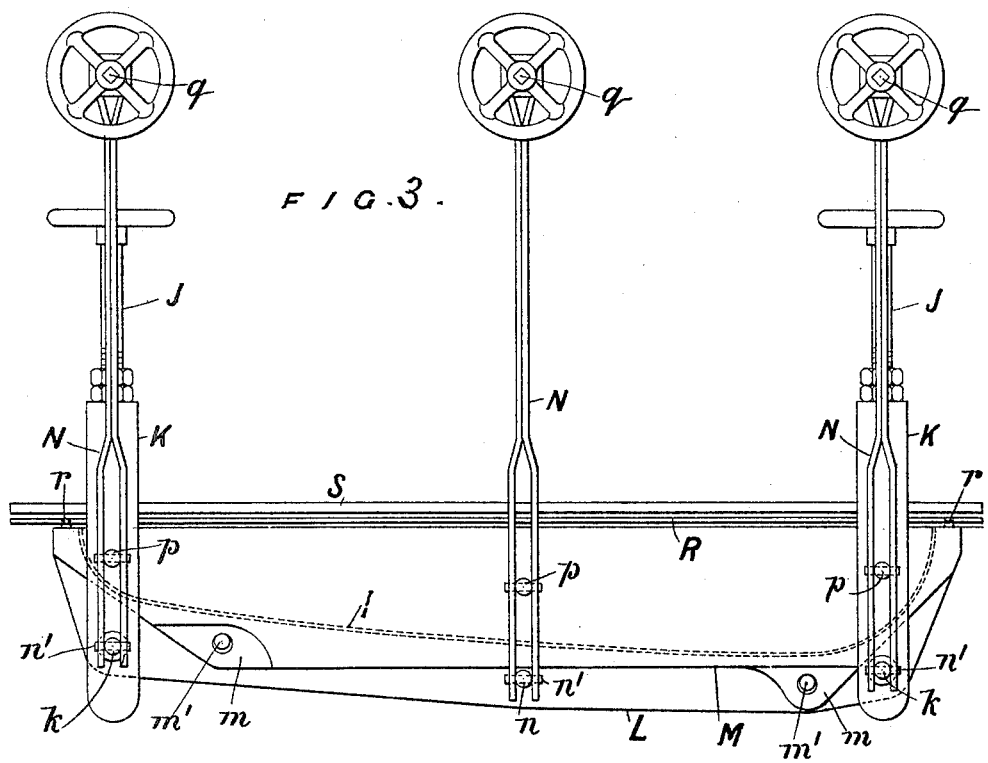
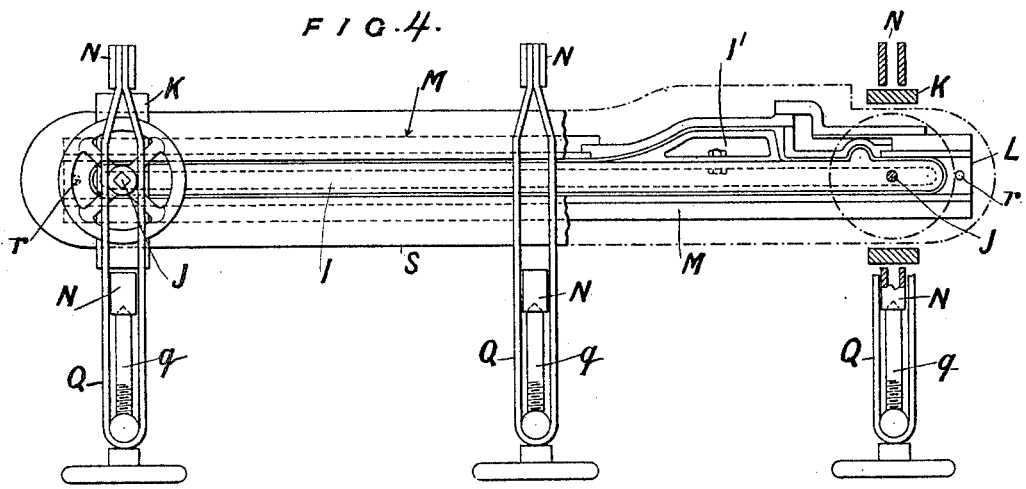
WITNESSES
INVENTOR:
H. W. Dover.
BY
ATTORNEYS.

(No Model.) 3 Sheets—Sheet 3.

H. W. DOVER.
APPARATUS FOR MANUFACTURING CYCLE GEAR CASES.

No. 581,576. Patented Apr. 27, 1897.

WITNESSES:

INVENTOR:
H. W. Dover.
BY
ATTORNEYS

UNITED STATES PATENT OFFICE.

HORACE WALTER DOVER, OF NORTHAMPTON, ENGLAND.

APPARATUS FOR MANUFACTURING CYCLE-GEAR CASES.

SPECIFICATION forming part of Letters Patent No. 581,576, dated April 27, 1897.

Application filed November 10, 1896. Serial No. 611,621. (No model.)

*To all whom it may concern:*

Be it known that I, HORACE WALTER DOVER, engineer, a subject of the Queen of Great Britain, residing at Mayorhold, Northampton, in the county of Northampton, England, have invented certain new and useful Improvements in Apparatus for the Manufacture of Cycle-Gear Cases, of which the following is a specification.

This invention relates to an apparatus for molding cycle-gear cases of xylonite, celluloid, and the like, (of the kind known as the "Dover" gear-case;) and the invention comprises a finishing-tool for bringing the roughly-molded article to its final form.

In my copending application, Serial No. 621,693, filed February 2, 1897, I described and claimed a preparatory tool for bringing the material roughly into form.

The gear-case is made in halves divided longitudinally at the plane of the crank and driving-wheel axles of the machine, and as the two halves differ somewhat in shape a set of preparatory and finishing tools should be provided for each, although the same preparatory tool might be used for both halves, if desired.

Reference is to be had to the accompanying drawings, forming part of this specification, wherein—

Figure 1:
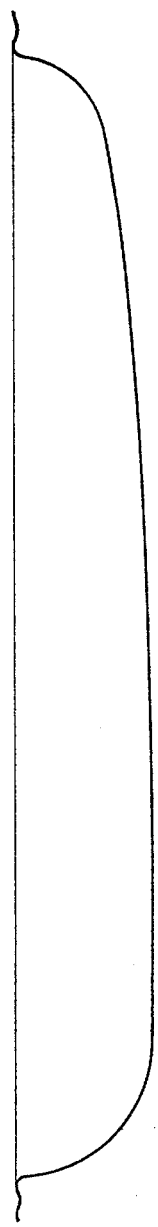
Figure 2:
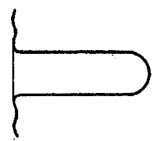
Figure 5:
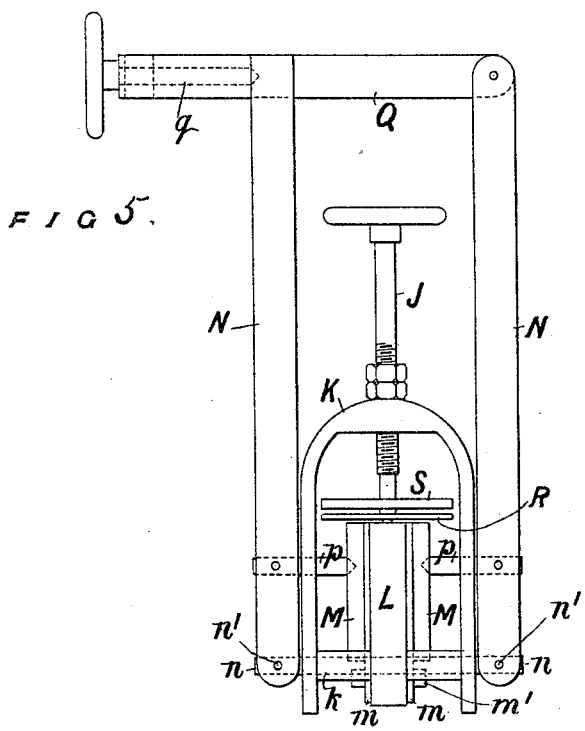
Figure 6:
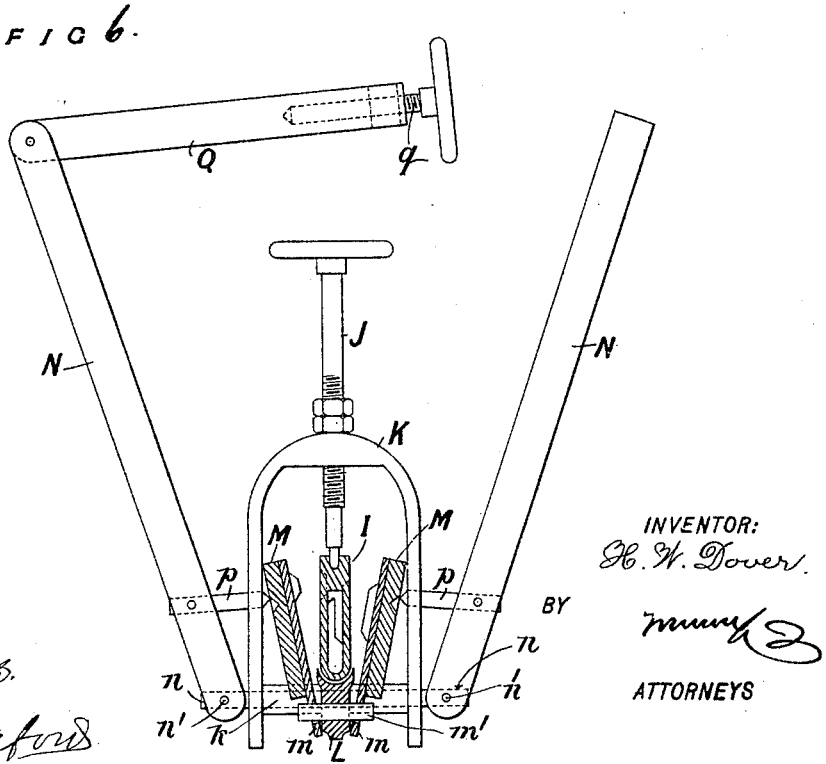

Figure 1 is a longitudinal section of the roughly-molded case prior to the application of the finishing apparatus. Fig. 2 is a cross-section thereof. Fig. 3 is a side elevation of the finishing apparatus; Fig. 4, a plan thereof; Fig. 5, an end elevation; and Fig. 6, a cross-section of the finishing-tool, showing the matrix in the opened position.

The same letters of reference indicate the same parts in all the figures.

The tool for finishing the article roughly molded, as shown in Figs. 1 and 2, comprises a male die or plunger I and a female die or matrix, respectively corresponding to the internal and external final form of the half-case, the male die being actuated by pressure-screws J, mounted in stirrup-brackets K, pivoted at $k$ to the framing of the female die, and the female die being formed of a middle member or bottom bar L, having uprising ends and corresponding on the inner face to the shape of the rounded bottom and ends of the molded article and of two cheek-plates M M, forming the two sides of the mold. The cheek-plates M are pivoted loosely at either side of the middle member L by means of tangs $m$, apertured to rest, swing, and slide upon pins $m'$, projecting from the middle member L, so that the cheek-plates M may be swung outward, as shown in Fig. 7, in order to enable the plunger I to be forced down home upon the middle member L and to permit of its release when the operation is terminated. These cheek-plates M are closed against the middle member L by pairs of levers N, each of which is pivoted universally to the middle member by two axes $n$ $n'$ (whereof one—viz., $n$—may consist of a prolongation of pin $k$) at right angles, and these levers act on the cheek-plates through thrust-pins $p$, the extremities of the levers of each pair being drawn together to apply the pressure necessary to close the cheeks against the central member by a screw-coupling formed by a stirrup Q, pivoted to the one lever of the pair, and a pressure-screw $q$, screwing through a nut in the end of the stirrup and bearing against the other lever of the pair. The male die or plunger I is made hollow and strengthened by transverse ribs, and it is provided with a detachable offset I', bolted to it at one side, which may be changed to vary the form of the die to suit particular requirements, the corresponding part of the adjacent cheek-plate being made detachable, so that it may be changed also. In conjunction with this mold there is used a die-plate R, apertured to correspond to the shape of the mouth of the mold, and which rests on the upturned ends of the middle member of the mold, to which it is fitted by steady-pins $r$. This die-plate is slipped over the partially-molded article when the latter is placed upon the male die I, which is removable from the press for the purpose. It serves to clip the partially-molded article upon the die I when the whole is placed as one in the press, the plate R, when in position therein, serving to support the marginal flange of the partly-molded article. A pressing-plate S rests as a dead-weight on the marginal flange and serves to retain the flange in place during the additional drawing which the material undergoes when the die or plunger I is forced home. After this has been done the cheek-plates M are closed in by means of the levers N and screw-couplings, in order to close the mold and complete the molded article.

The operations of forcing the plunger home and closing in the sides of the matrix are performed with the aid of heat, preferably while the tool is immersed in water at the proper temperature to soften the material, and when the operation is complete the material is caused to set in the molded form by cooling of the mold, preferably by immersion in cold water.

After the operation is completed the marginal portions of the molded article are trimmed off.

The die or plunger I and the members L and M of the matrix are preferably made of gun-metal, the whole of the tool being made of the same or of other inoxidizable alloy.

What I claim is—

1. In a tool for molding xylonite, celluloid or the like material, the combination of a male die or plunger, a matrix formed of a middle member inclosing the bottom and ends, and of two loosely-pivoted side members, and means for forcing and holding the die in the matrix and for closing the sides of the matrix upon the article on the die, substantially as specified.

2. In a tool for molding xylonite, celluloid, or the like material, the combination of a screw-operated male die or plunger, a matrix formed of a middle member and of two loosely-pivoted side members, and of levers and screw-operated connecting-links for closing the sides of the matrix upon the article on the die, substantially as specified.

3. In a tool for molding xylonite, celluloid or the like material, the combination of a screw-operated male die or plunger, a matrix formed of a middle member and of two loosely-pivoted side members, closed by levers and screw-couplings against the article on the die, and of a die-plate to support the unmolded marginal flange of the article, and a presser-plate to hold the flange down on the die-plate, substantially as specified.

HORACE WALTER DOVER.

Witnesses:
WILLIAM TRIMMER,
T. W. KENNARD.